United States Patent
Park et al.

(10) Patent No.: US 8,767,699 B2
(45) Date of Patent: Jul. 1, 2014

(54) APPARATUS AND METHOD FOR TRANSMITTING PACKET DATA IN WIRELESS SENSOR NETWORK

(75) Inventors: Hyung-Rae Park, Gyeonggi-do (KR); Jongsub Cha, Daejeon (KR); Sang-Hyun Mo, Daejeon (KR); Seung-Il Myong, Daejeon (KR); Heyung-Sub Lee, Daejeon (KR); Jong-Suk Chae, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 350 days.

(21) Appl. No.: 12/794,997

(22) Filed: Jun. 7, 2010

(65) Prior Publication Data

US 2011/0110218 A1    May 12, 2011

(30) Foreign Application Priority Data

Nov. 12, 2009  (KR) .................. 10-2009-0109224

(51) Int. Cl.
*H04B 7/216*  (2006.01)

(52) U.S. Cl.
USPC .......................................... 370/342; 375/150

(58) Field of Classification Search
USPC ................. 370/335, 342; 375/130, 147, 150
See application file for complete search history.

(56) References Cited

U.S. PATENT DOCUMENTS

| 5,621,752 | A | * | 4/1997 | Antonio et al. | ............ | 375/144 |
| 5,960,032 | A | * | 9/1999 | Letaief et al. | ............ | 375/146 |
| 6,115,410 | A | * | 9/2000 | Naruse | ............ | 375/130 |
| 6,219,374 | B1 | * | 4/2001 | Kim et al. | ............ | 375/130 |
| 7,099,371 | B2 | | 8/2006 | Roh | | |
| 2002/0071476 | A1 | * | 6/2002 | Park | ............ | 375/130 |
| 2003/0185281 | A1 | | 10/2003 | Roh | | |
| 2006/0268672 | A1 | | 11/2006 | Sari | | |

FOREIGN PATENT DOCUMENTS

| EP | 0 836 303 | A3 | 1/2000 |
| KR | 10-0155510 | B1 | 7/1998 |
| KR | 10-0173101 | B1 | 10/1998 |
| WO | 00/62436 | | 10/2000 |

OTHER PUBLICATIONS

Dongwook Lee et al., "Direct Sequence Spread Spectrum Walsh-QPSK Modulation", IEEE Transactions on Communications, vol. 46, No. 9, Sep. 1998, 1227-1232 pages.
Information technology—Real Time Locating Systems (RTLS)—Part 2: 2,4 GHz air interface protocol (2$^{nd}$ Edition), ISO/IEC FDIS 24730-2:2006(E).

* cited by examiner

*Primary Examiner* — Jung Park
(74) *Attorney, Agent, or Firm* — Staas & Halsey LLP

(57) ABSTRACT

Provided is an apparatus and method for transmitting packet data in a WSN. The apparatus for transmitting packet data in a WSN includes: a serial-to-parallel converter to parallel-convert information and output the converted information to two channel paths; a Walsh code pair generation unit to select an arbitrary Walsh code pair, mix the selected Walsh code pair with a pseudo noise (PN) code, and output one Walsh code to one channel path and the other Walsh code to the other channel path; a first mixer to mix the signals inputted to two channel paths, and generate a spread symbol for each path; a delay to delay the other channel path signal by a predetermined time; and a transmission unit to convert one channel path signal and the other channel path signal delayed by the delay into transmission frequency band signals, and transmit the converted signals as wireless signals.

18 Claims, 3 Drawing Sheets

$W_{I,n}^{(j)}, W_{Q,n}^{(j+1)} C_n$ : $j$-th Walsh code pair, $C_n$: spreading code, $P$ : transmit power, $T_c$ : chip duration

APPARATUS AND METHOD FOR TRANSMITTING PACKET DATA IN WIRELESS SENSOR NETWORK

CROSS-REFERENCE(S) TO RELATED APPLICATIONS

The present application claims priority of Korean Patent Application No. 10-2009-0109224, filed on Nov. 12, 2009, which is incorporated herein by reference in its entirety.

BACKGROUND OF THE INVENTION

1. Field of the Invention

Exemplary embodiments of the present invention relate to an apparatus and method for transmitting packet data; and, more particularly, to an apparatus and method for transmitting packet data in a wireless sensor network.

2. Description of Related Art

In general, a wireless sensor network technology refers to a technology in which sensors sense a specific phenomenon or state in place of human beings such that the sensed information is collected to be used as useful data. As a more advanced form of the wireless sensor network technology, the concept of a ubiquitous sensor network (USN) technology has been recently proposed. The concept of the USN technology may be described as follows: sensors sense all kinds of information associated with human beings' lives such that the sensed information is collected through a wireless/wired network so as to be used as useful information.

In the USN technology, when the sensed information is collected through the wireless network, the information may be secured more efficiently than when collected through the wired network. As such, the USN technology using a wireless network may be referred to as a wireless sensor network (WSN) technology. Therefore, the USN technology using a wireless network includes sensor nodes and sink nodes. The sensor nodes serve to process information sensed by a sensor and transmit the sensed information through a predetermined method. The sink nodes serve to collect information transmitted from the sensor nodes and transmit the collected information to a node such as a task manager capable of collecting and processing information on the USN network. Then, the task manager may extract or select useful information from the collected information such that the useful information is utilized in various fields.

In the above-described USN technology using a wireless network, increased attention is being focused on the reliable reception of data sensed by the sensor nodes and the power efficiency of mobile equipments of the sensor nodes using a battery.

For example, a real time locating system locates the position of a tag and secures simple information around the tag, using a relatively short signal transmitted from the tag. Since the tag of the real time locating system is operated by a battery, it is important to reduce power consumption as much as possible. Furthermore, the hardware configuration thereof should be designed in as a simple manner as possible.

In the real time locating system, the tag transmits information using spread spectrum signals with a large bandwidth, in order to increase the positional accuracy. At this time, the spread spectrum signals should have a small peak-to-average power ratio (PAPR) to reduce the power consumption of the tag. Furthermore, a packet transmitted from the tag may collide with packets transmitted from other tags. Therefore, the system should be designed in consideration of the possibility of packet collisions among the tags.

Conventionally, an ISO/IEC 24730-2 system has been provided as a representative system for implementing a tag. However, since the ISO/IEC 24730-2 system adopts a BPSK spread modulation scheme, the PAPR characteristic is degraded by zero-crossing of signals.

Furthermore, the ISO/IEC 24730-2 system uses one fixed spreading code. Therefore, when a plurality of different tags transmit packets at the same time, the packets may collide with one another to be lost. Therefore, the ISO/IEC 24730-2 system is designed to repetitively transmit an identical packet at random time intervals, in order to avoid the packet loss by the collisions. As such, the ISO/IEC 24730-2 system which is being actively used at present inevitably transmits a large number of packets repetitively, considering the possibility of packet collisions. As a result, the power consumption of the tag significantly increases.

SUMMARY OF THE INVENTION

An embodiment of the present invention is directed to an apparatus and method capable of preventing packet collisions in tags or sensors of a wireless sensor network such as a USN.

Another embodiment of the present invention is directed to an apparatus and method capable of improving packet transmission performance of tags or sensors in a wireless sensor network such as a USN.

Another embodiment of the present invention is directed to an apparatus and method capable of improving transmission efficiency of tags or sensors in a wireless sensor network such as a USN.

Another embodiment of the present invention is directed to an apparatus and method capable of reducing power consumption of tags or sensors in a wireless sensor network such as a USN.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, an apparatus for transmitting packet data in a WSN includes: a serial-to-parallel converter configured to parallel-convert information to be transmitted and output the converted information to first and second channel paths, respectively; a Walsh code pair generation unit configured to select an arbitrary Walsh code pair among Walsh code pairs predetermined by considering cross correlations, mix the selected Walsh code pair with a pseudo noise (PN) code, and output one Walsh code between the Walsh code pair to the first channel path and the other Walsh code to the second channel path; a first mixer configured to mix the signals inputted to the first and second channel paths, respectively, and generate a spread symbol for each path; a delay configured to delay the second channel path signal by a predetermined time; and a transmission unit configured to convert the first channel path signal and the second channel path signal delayed by the delay into transmission frequency band signals, and transmit the converted signals as wireless signals.

The apparatus may further include a filter configured to remove out-of-band signals from the respective symbols of the first and second channel paths which are spread by the first mixer, and provide the first channel path signal to the transmission unit and the second channel path signal to the delay.

The Walsh code pair generation unit may include: a random number generator configured to generate an arbitrary natural number in the number range of the Walsh code pairs; a Walsh code pair generator configured to output a Walsh code pair having a sequence corresponding to the number generated by the random number generator; a PN generator configured to generate and output a predetermined PN code; and a second mixer configured to mix the outputted Walsh code pair with the output of the PN generator, and output the Walsh code pair.

The Walsh code pair generator may include a memory configured to store the Walsh code pairs predetermined by considering cross correlations.

The predetermined time by which the delay delays the second channel path signal may correspond to the half of chip duration.

In accordance with another embodiment of the present invention, a method for transmitting packet data in a WSN includes: serial-to-parallel converting information to be transmitted and outputting the converted information; selecting an arbitrary Walsh code pair among Walsh code pairs predetermined by considering cross correlations; mixing the selected Walsh code pair with a predetermined pseudo noise (PN) code, and outputting the Walsh code pair; spreading the parallel-converted information into Walsh codes corresponding to the information; delaying one symbol between the spread symbols by a predetermined time; and converting the delayed symbol and the spread symbol into transmission frequency band signals to transmit as wireless signals.

The method may further include removing out-of-band signals from the respective spread symbols.

DESCRIPTION OF SPECIFIC EMBODIMENTS

Figure 1:
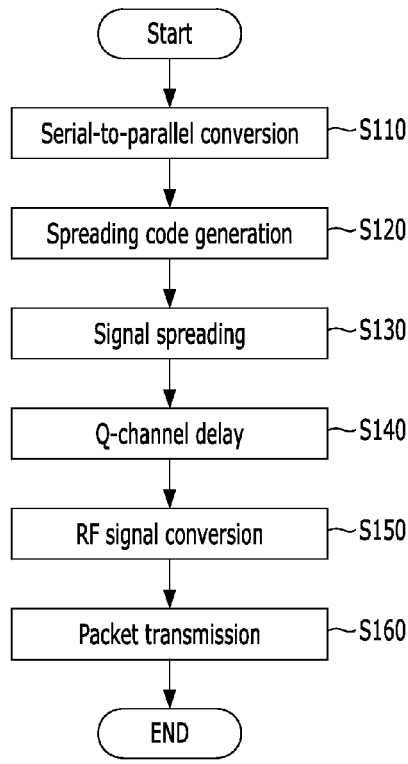
FIG. 1 is a flow chart explaining a process of wirelessly transmitting unique information of a tag or data sensed by a sensing node in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention. The drawings are not necessarily to scale and in some instances, proportions may have been exaggerated in order to clearly illustrate features of the embodiments.

In this specification, the terms tag and sensor node may be used as the same meaning, and may indicate all nodes which only transmit information to configure a USN or transmit sensed information.

Hereafter, a direct sequence spread spectrum modulation method in accordance with an embodiment of the present invention will be described with reference to FIGS. 1 and 2. First, the configuration of a tag or sensor node in accordance with the embodiment of the present invention will be described with reference to FIG. 2.

Figure 2:
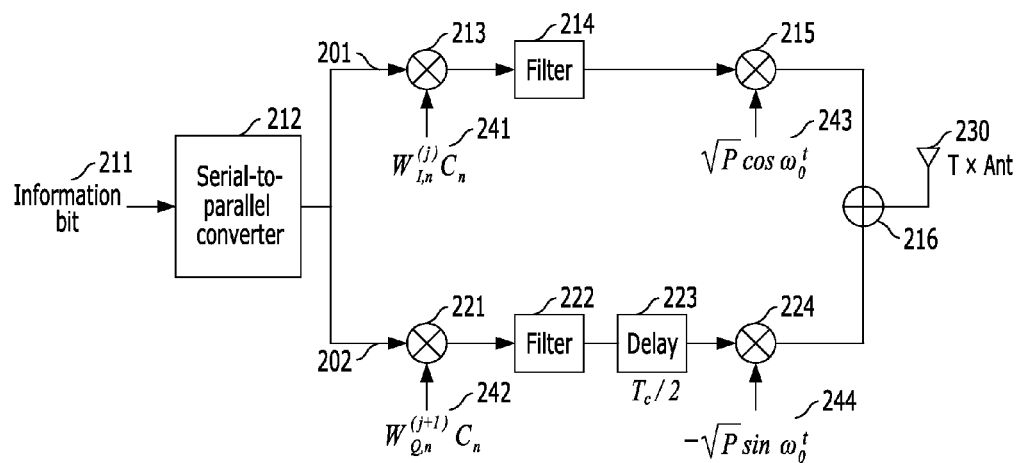
FIG. 2 is a configuration diagram of a wireless transmitter for wirelessly transmitting unique information of a tag or data sensed by a sensing node in accordance with the embodiment of the present invention.

FIG. 2 is a configuration diagram of a wireless transmitter for wirelessly transmitting data sensed by a tag or sensor node in accordance with the embodiment of the present invention.

Information illustrated in FIG. 2 may be data sensed by various types of sensors or predefined information to be transmitted by tags. Examples of the sensors may include an acceleration sensor, a geomagnetic sensor, a pressure sensor, a displacement sensor, a flow rate sensor, a squid sensor, and so on. Furthermore, examples of the tags may include a Radio-Frequency Identification (RFID) tag, a Smart Active Layer (SAL) tag, a semi-SAL tag, and so on.

Digital information sensed by the sensors or unique information stored in the tags is inputted to a serial-to-parallel converter 212. The serial-to-parallel converter 212 is configured to receive the sensed information or the unique information stored in the tags as a serial digital value and convert the received information into parallel data. For example, when two-bit serial information is inputted, the serial-to-parallel converter 212 converts the two-bit serial information into one-bit parallel data 201 and 202. The converted parallel data 201 and 202 are inputted to an I-channel path and a Q-channel path, respectively. The I-channel path includes a first mixer 213, a first filter 214, and a second mixer 215, and the Q-channel path includes a third mixer 221, a second filter 222, a delay 223, and a fourth mixer 224. FIG. 2 does not illustrate a Walsh code generation unit configured to generate an I-channel spreading code and a Q-channel spreading code which are provided to the I-channel path and the Q-channel path, respectively. The Walsh code generation unit will be described below in detail with reference to FIGS. 3 and 4.

Now, an operation of processing the information which is parallel-converted by the serial-to-parallel converter 212 and then inputted to the I-channel path will be described. The parallel-converted I-channel information is inputted to the first mixer 213. The first mixer 213 receives an I-channel spreading code ($W_{I,n}^{(j)}C_n$) 241 which is one between a Walsh code pair randomly selected from n preset Walsh code pairs. Here, $W_{I,n}^{(j)}$ represents a Walsh code which is inputted to the I-channel path between a j-th Walsh code pair randomly selected from the n preset Walsh code pairs, and $C_n$ represents a spreading code.

The first mixer 213 spreads the information inputted to the I-channel path by using the one between the randomly-selected Walsh code pair, and then outputs the spread information. The symbol spread by the first mixer 213 is inputted to the first filter 214. The first filter 214 may be implemented as a pulse shaping filter, and is configured to remove out-of-band signals from an I-channel signal of the spread symbol.

The symbol filtered by the first filter 214 is inputted to the second mixer 215. The second mixer 215 is configured to control transmit power and receive a first transmission carrier signal ($\sqrt{P} \cos \omega_0 t$) 243 to guarantee a quadrature phase between the data transmitted to the I-channel and the Q-channel, respectively. In the first transmission carrier signal, P represents transmit power, $\omega_0$ represents the phase angle of a transmission carrier, and t represents time.

Next, an operation of processing the information which is parallel-converted by the serial-to-parallel converter 212 so as to be inputted to the Q-channel path will be described. The data 202 inputted to the Q-channel among the serial-to-parallel converted data is inputted to the third mixer 221. The third mixer 221 receives a Q-channel spreading code ($W_{Q,n}^{(j+1)}C_n$) 242 which is the other one between the Walsh code pair randomly selected from the n preset Walsh code pairs. Here, $W_{Q,n}^{(j+1)}$ represents a Walsh code which is inputted to the Q-channel between the j-th Walsh code pair randomly selected from the n preset Walsh code pairs, and $C_n$ represents a spreading code. The reason why the Walsh code inputted to the Q-channel between the j-th Walsh code pair is represented by $W_{Q,n}^{(j+1)}$ is because when it is assumed that the overall Walsh codes are set in the sequence of 1, 2, 3, 4, . . . , j, j+1, j+2, . . . , j and j+1 compose one pair.

The third mixer 221 spreads the information inputted to the Q-channel using the other one between the randomly-selected Walsh code pair, and then outputs the spread information. The symbol spread by the third mixer 221 is inputted to the second filter 222. The second filter 222 may be implemented as a pulse shaping filter and is configured to output the spread symbol while limiting the amplitude of the symbol. The second filter 222 is configured to remove out-of-band signals from a Q-channel signal of the spread symbol.

The symbol filtered by the second filter 222 is inputted to the delay 223. The delay 223 is configured to delay the filtered symbol by a time ($T_c/2$) corresponding to the half of chip duration. The symbol delayed in such a manner is inputted to the fourth mixer 224. The fourth mixer 224 is configured to control transmit power and receive a second quadrature phase signal ($\sqrt{P}$ sin $\omega_0 t$) 244 to guarantee a quadrature phase between the data transmitted to the I-channel path and the Q-channel path, respectively. In the second quadrature phase signal, P represents transmit power, $\omega_0$ represents the phase angle of a transmission carrier, and t represents time.

As described above, the signals processed in the I-channel path and the P-channel path are added by an adder 216, and then configured as a packet to be transmitted as a wireless signal through a transmission antenna (Tx Ant) 230. FIG. 2 does not illustrate a component for transmitting the packet added by the adder 216 as a radio frequency (RF) signal. The packet to be transmitted as an RF signal is an aggregate of the data spread through the I-channel path and the Q-channel path. A plurality of spread data contained in one packet which is to be transmitted may have the same spreading code. Furthermore, the spreading code may be randomly generated whenever a packet is transmitted.

In accordance with the embodiment of the present invention, signals are extended through spreading codes generated by using a randomly-selected Walsh code. Therefore, it is possible to prevent a performance reduction caused by the collision between packets having the same spreading code.

Such spreading codes will be described below in more detail with reference to FIGS. 3 and 4.

FIG. 1 is a flow chart showing a process of wirelessly transmitting the unique information of tags or data sensed by sensing nodes in accordance with the embodiment of the present invention. Referring to FIG. 1, the process of wirelessly transmitting the unique information of tags or data sensed by sensing nodes in accordance with the embodiment of the present invention will be described as follows.

At a step S110, the serial-to-parallel converter 212 serial-to-parallel converts serial information 21 which is sensed and inputted by a sensor or predetermined and stored in a tag, and then outputs the converted information. For example, when information sensed by a sensor or unique information stored in a tag is serially inputted, that is, when two-bit serial information is inputted, the serial-to-parallel converter 212 converts the information into two one-bit parallel data 130 and 140.

At a step S120, a Walsh code pair generation unit having a configuration of FIG. 4 which will be described below generates one Walsh code pair, which is randomly selected from N preset Walsh code pairs whenever a packet is transmitted, by using a pseudo noise (PN) code. That is, the Walsh code pair generation unit generates an I-channel spreading code and a Q-channel spreading code. The packet is an aggregate of data spread by using the I-channel spreading code and the Q-channel spreading code. Therefore, the plurality of spread data to be contained in one packet which is to be transmitted may have the same spreading code. Furthermore, the spreading code may be randomly generated whenever a packet is transmitted.

At a step S130, the first mixer 213 and the third mixer 221 spread the information which is parallel-separated into the I-channel path and the Q-channel path by the serial-to-parallel converter, using the respective spreading codes generated at the step S120.

At a step S140, the symbol spread in the Q-channel path is delayed by a predetermined time. The predetermined time may correspond to the half of chip duration ($T_c/2$). At a step S150, the signals spread and delayed in the I-channel path and the Q-channel path are converted into RF signals by the unit of packet. At a step S160, the packet converted as the RF signals is transmitted at random time intervals.

Figure 3:
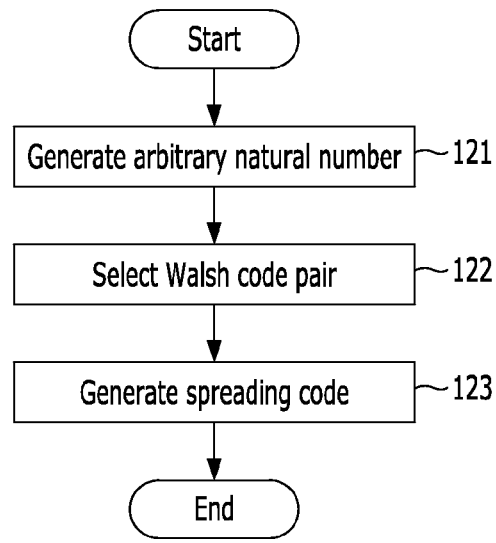
FIG. 3 is a detailed flow chart explaining a process of generating a spreading code in accordance with the embodiment of the present invention.

FIG. 3 is a detailed flow chart of the process of generating the spreading codes in accordance with the embodiment of the present invention. FIG. 4 is a configuration diagram of a spreading code generation device in accordance with the embodiment of the present invention.

Figure 4:
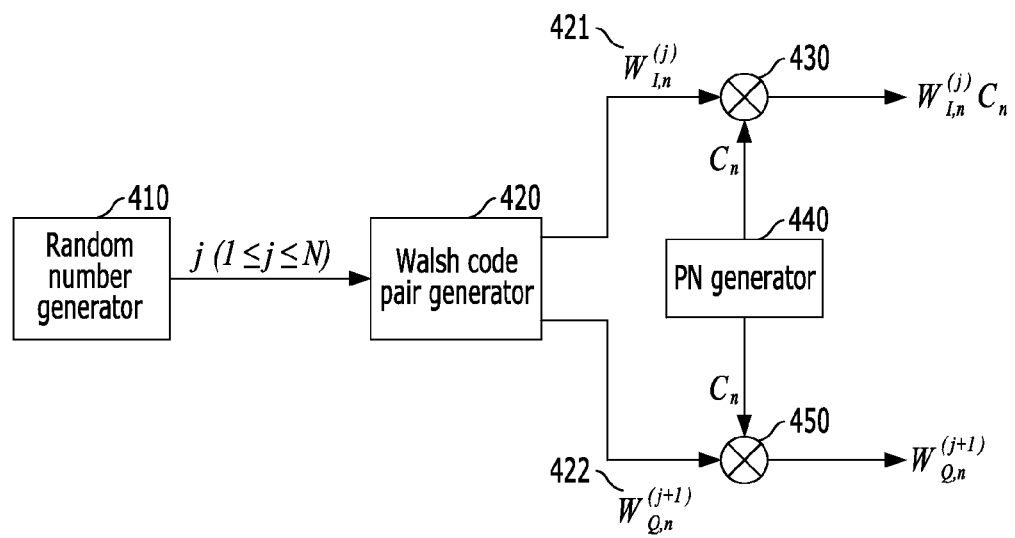
FIG. 4 is a configuration diagram of a spreading code generation device in accordance with the embodiment of the present invention.

Referring to FIG. 4, the configuration and operation of the spreading code generation device in accordance with the embodiment of the present invention will be described.

A random number generator 410 is configured to generate a random number which is equal to or more than 1 and equal to or less than a predetermined positive number N. The random number is randomly generated so as not to have a specific pattern. Furthermore, the predetermined positive number N may correspond to the number of Walsh code pairs. The random number generated by the random number generator 410 is inputted to a Walsh code generator 420.

The Walsh code pair generator 420 may generate a Walsh code pair depending on a predetermined rule at each time or simply store Walsh code pairs generated on the basis of a predetermined rule. The Walsh code pair generator 420 outputs a Walsh code pair of which the sequence corresponds to the positive number generated by the random number generator 410, among the generated or simply stored Walsh code pairs. The N Walsh code pairs may be determined as Walsh code pairs having a low cross correlation among all possible Walsh code pairs. For example, Walsh code pairs used in a real time locating system are $\{W^{(j)}, W^{(j+1)}; j=0, 2, 8, 16, 18\}$.

For example, when 16 Walsh code pairs are present, the number of numbers which may be generated by the random number generator becomes 16. When a number 8 is generated among the numbers, the eighth Walsh code pair is outputted.

The Walsh code pair is outputted to predetermined paths in order that the Walsh code pair is outputted to the I-channel path and the Q-channel path, respectively. As described above with reference to FIG. 2, the path through which one Walsh code is outputted to the first mixer 213 is referred to as the I-channel path, and the path through which the other Walsh code is outputted to the third mixer 221 is referred to as the Q-channel path. Therefore, one Walsh code outputted to the I-channel path between the Walsh code pair becomes $W_{I,n}^{(j)}$ 421, and the other Walsh code outputted to the Q-channel path becomes $W_{Q,n}^{(j+1)}$ 422.

Meanwhile, a PN generator 440 is configured to generate a PN code $C_n$ based on a predetermined rule, and output the generated PN code $C_n$ to a fifth mixer 430 and a sixth mixer 450. Then, the fifth mixer 430 positioned in the I-channel path mixes the Walsh code inputted to the I-channel path with the PN code $C_n$ generated by the PN generator 440, and generates an I-channel spreading code ($W_{I,n}^{(j)}C_n$) 241 to be inputted to the first mixer 213 of FIG. 2. Furthermore, the sixth mixer 450 positioned in the Q-channel path mixes the Walsh code inputted to the Q-channel path with the PN code $C_n$ generated by the PN generator 440, and generates a Q-channel spreading code ($W_{I,n}^{(j)}C_n$) 242 to be inputted to the third mixer 221 of FIG. 2.

Now, the process of generating the spreading codes in accordance with the embodiment of the present invention will be described with reference to FIG. 3.

First, the random number generator 410 randomly generates an arbitrary natural number among 1 to N whenever a packet is transmitted, at a step S121. Then, the Walsh code generator 220 selects a Walsh code pair corresponding to the natural number generated at the step S121 among the N preset Walsh code pairs by referring to the natural number, and then outputs one Walsh code between the selected Walsh code pair to the I-channel path and the other Walsh code to the Q-channel path, at a step S122.

The N preset Walsh code pairs may be determined as Walsh code pairs having a small cross correlation among all possible Walsh code pairs. For example, Walsh code pairs used in the real time locating system are $\{W^{(j)}, W^{(j+1)}; j=0, 2, 8, 16, 18\}$.

Then, the fifth mixer 430 generates an I-channel spreading code 241 by multiplying one Walsh code 421 corresponding to its path between the Walsh code pair selected and outputted at the step S122 by a PN code generated by the PN generator 440. The sixth mixer 450 generates a Q-channel spreading code 242 by multiplying the other Walsh code 422 corresponding to its path by the PN code generated by the PN generator 440.

Hereafter, the effects of the scheme in accordance with the embodiment of the present invention will be described by comparing the conventional BPSK spread modulation scheme.

When the conventional BPSK spread modulation scheme is adopted, the PAPR increases due to the zero-crossing of signals, thereby degrading power efficiency. On the other hand, since the Offset Quadrature Phase Shift Keying (OQPSK) scheme using a Walsh code pair is adopted in the embodiment of the present invention, it is possible to avoid the zero-crossing of signals. Accordingly, when the OQPSK scheme in accordance with the embodiment of the present invention is used, the PAPR decreases in comparison with the conventional BPSK spread modulation scheme. Furthermore, while two independent PN codes are used in a general OQPSK scheme, one PN code is used in the OQPSK scheme in accordance with the embodiment of the present invention. Therefore, the hardware configuration is simplified.

Table 1 shows the results obtained by comparing the PAPR of the conventional scheme with that of the scheme in accordance with the embodiment of the present invention with respect to various roll-off factors.

TABLE 1

|  | $\beta = 0.9$ | $\beta = 1.9$ | $\beta = 2.3$ |
|---|---|---|---|
| DBPSK/BPSK | 2.46 | 3.48 | 3.94 |
| Walsh OQPSK | 1.18 | 0.58 | 0.98 |

As described in Table 1, it can be seen that the PAPR of the scheme in accordance with the embodiment of the present invention remarkably decreases in comparison with that of the conventional scheme.

In the embodiment of the present invention, the pair of pulse shaping filters 214 and 222 are adopted in the I-channel path and the Q-channel path, respectively, before the step S140 of FIG. 1 is performed. The pair of pulse shaping filters 214 and 222 may be used to remove out-of-band signals from the spread I-channel and Q-channel signals.

Figure 5:
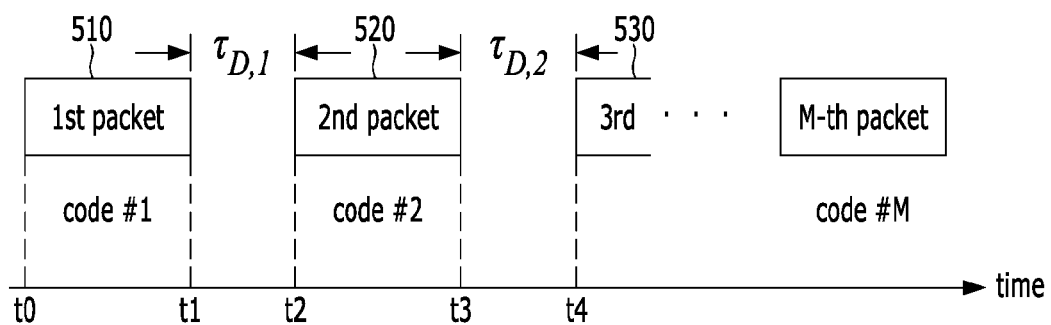
FIG. 5 is a timing diagram when the tag or sensor node in accordance with the embodiment of the present invention transmits data.

FIG. 5 is a timing diagram showing a state in which the tag or sensor node in accordance with the embodiment of the present invention transmits data. FIG. 5 shows an example in which an identical packet is repetitively transmitted to prevent a failure in position location or transmission of sensed data due to the packet collision or bit error.

The identical packet may be repetitively transmitted predetermined times, for example, two, three, four times or the like. Therefore, the tag in accordance with the embodiment of the present invention transmits a first packet 510 using a first code #1 for a time interval from t0 to t1. Then, the tag waits for a time interval from t1 to t2, that is, for a time interval $\tau_{D,1}$ which is arbitrarily selected within a predetermined time interval. After that, the tag generates a second packet 520 using a second code #2 different from the first code #1 and then transmits the generated second packet 520 for a time interval from t2 to t3. When the tag is to transmit the packet M times which are more than two times, the tag waits for a time interval from t3 to t4, that is, for a time interval $\tau_{D,2}$ which is arbitrarily selected within the predetermined time interval.

The waiting time interval $\tau_{D,1}$ until the second packet 520 is transmitted after the first packet 510 is transmitted may be identical to or different from the waiting time interval $\tau_{D,2}$ until the third packet 530 is transmitted after the second packet 520 is transmitted. However, it is desirable that the waiting time intervals are set to different values from each other.

That is, as shown in FIG. 5, when it is assumed that the tag transmits M identical packets at proper time intervals, the tag transmits the packets with random time intervals set between the respective packets, in order to avoid the consecutive collision with packets transmitted from other tags. As the packets are transmitted in such a manner, it is possible to further reduce the possibility of packet collisions which may occur when a plurality of different tags transmit packets at the same time.

When the number of tags increases, the possibility of packet collisions increases even though the packets are transmitted at random time intervals. In the existing fixed spreading code scheme, a large number of packets are transmitted repetitively in consideration of the possibility of packet loss by the collisions. Therefore, the power consumption of the tag significantly increases. In the embodiment of the present invention, however, although transmitted packets collide with each other, the packets may be demodulated by using different spreading codes. Therefore, it is possible to reduce the number of packets which are to be transmitted repetitively, compared with the conventional single spreading code scheme in which all tags use the same spreading code. Therefore, it is possible to significantly reduce power consumption during the transmission in the tag in accordance with the embodiment of the present invention.

The number of packets to be transmitted repetitively may be determined through an experiment or depending on a condition in which the tag is used. At this time, the number of packets to be transmitted repetitively significantly decreases in comparison with the conventional scheme.

In accordance with the embodiment of the present invention, a PAPR of 1.3 dB to 3 dB may be decreased in comparison with the existing ISO/IEC 24730-2 system. Furthermore, since a randomly-selected Walsh code is used, packets may be independently demodulated even though packets collide with each other. Therefore, it is possible to reduce the number of packets to be transmitted repetitively in comparison with the existing scheme in which the modulation is performed using a fixed spreading code. That is, it is possible prevent the packet collisions in the tags or sensor nodes in a wireless sensor network such as a USN. Therefore, the packet transmission performance and the transmission efficiency may be improved, and the power consumption may be reduced.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting packet data in a wireless sensor network (WSN), comprising:
    a serial-to-parallel converter configured to parallel-convert information to be transmitted, and output the converted information as first channel data and second channel data, respectively;
    a first mixer and a second mixer configured to mix the first channel data and the second channel data with a pseudo noise (PN) code and a Walsh code pair;
    a first filter and a second filter configured to filter the mixed first channel data and the mixed second channel data;
    a delay configured to delay the filtered second channel data;
    a third mixer and a fourth mixer configured to mix the filtered first channel data and the delayed second channel data with respective corresponding quadrature phase signals,
    wherein the Walsh code pair is determined by cross correlations in order to have a small cross correlation among the plurality of all Walsh code pairs,
    wherein index of the Walsh code pair corresponds to index {j=0, 2, 8, 16, 18}.

2. The apparatus of claim 1, wherein the first filter and the second filter remove out-of-band signals from respective symbols of the mixed first channel data and the mixed second channel data.

3. The apparatus of claim 1, further comprising:
    a random number generator configured to generate an arbitrary natural number in a number range of the Walsh code pairs;
    a Walsh code pair generator configured to output the Walsh code pairs having a sequence corresponding to the arbitrary natural number; and
    a PN generator configured to generate and output the PN code.

4. The apparatus of claim 1, further comprising a transmission unit configured to convert the mixed first channel data and second channel data with the quadrature phase signals into transmission frequency band signals, and transmit the transmission frequency band signals as wireless signals.

5. The apparatus of claim 1, wherein the third mixer and the forth mixer mix the filtered first channel data and the delayed second channel data with transmission carrier signals as the quadrature phase signals in order to have a quadrature phase.

6. The apparatus of claim 1, wherein when the same information is transmitted two or more times, a different Walsh code pair is used for each transmission of the information.

7. The apparatus of claim 1, wherein when the same information is transmitted three or more times, time intervals between respective transmissions of the information are set to different time intervals within a predetermined time interval.

8. An apparatus for transmitting packet data in a wireless sensor network (WSN), comprising:
    a serial-to-parallel converter configured to parallel-convert information to be transmitted and output the converted information to first and second channel paths, respectively;
    a Walsh code pair generation unit configured to select an arbitrary Walsh code pair among Walsh code pairs predetermined by considering cross correlations, mix the selected Walsh code pair with a pseudo noise (PN) code, and output one Walsh code between the Walsh code pair to the first channel path and the other Walsh code to the second channel path;
    a first mixer configured to mix the signals inputted to the first and second channel paths, respectively, and generate a spread symbol for each path;
    a delay configured to delay the second channel path signal by a predetermined time; and
    a transmission unit configured to convert the first channel path signal and the second channel path signal delayed by the delay into transmission frequency band signals, and transmit the converted signals as wireless signals,
    wherein the Walsh code pair generation unit comprises:
    a random number generator configured to generate an arbitrary natural number in the number range of the Walsh code pairs;
    a Walsh code pair generator configured to output a Walsh code pair having a sequence corresponding to the number generated by the random number generator;
    a PN generator configured to generate and output a predetermined PN code; and
    a second mixer configured to mix the outputted Walsh code pair with the output of the PN generator, and output the Walsh code pair.

9. The apparatus of claim 8, wherein the Walsh code pair generator comprises a memory configured to store the Walsh code pairs predetermined by considering cross correlations.

10. A method for transmitting packet data in a wireless sensor network (WSN), comprising:
    serial-to-parallel converting information to be transmitted, and outputting the converted information as first channel data and second channel data, respectively;
    mixing the first channel data and the second channel data with a pseudo noise (PN) code and a Walsh code pair;
    filtering the mixed first channel data and the mixed second channel data;
    delaying the filtered second channel data;
    mixing the filtered first channel data and the delayed second channel data with respective corresponding quadrature phase signals,
    wherein the Walsh code pair is determined by cross correlations in order to have a small cross correlation among the plurality of all Walsh code pairs,
    wherein index of the Walsh code pair corresponds to index {j=0, 2, 8, 16, 18}.

11. The method of claim 10, wherein in the filtering, out-of-band signals are removed from respective symbols of the mixed first channel data and the mixed second channel data.

12. The method of claim 10, further comprising:
generating an arbitrary natural number in a number range of the Walsh code pairs;
outputting the Walsh code pairs having a sequence corresponding to the arbitrary natural number; and
generating and outputting the PN code.

13. The method of claim 10, further comprising:
converting the mixed first channel data and second channel data with the quadrature phase signals into transmission frequency band signals; and
transmitting the transmission frequency band signals as wireless signals.

14. The method of claim 10, wherein in the mixing the filtering first channel data and the delayed second channel data, the filtering first channel data and the delayed second channel data are mixed with transmission carrier signals as the quadrature phase signals in order to have a quadrature phase.

15. The method of claim 10, wherein when the same information is transmitted two or more times, a different Walsh code pair is used for each transmission of the information.

16. The method of claim 10, wherein when the same information is transmitted three or more time, time intervals between respective transmissions of the information are set to different time intervals within a predetermined time interval.

17. A method for transmitting packet data in a wireless sensor network (WSN), comprising:
serial-to-parallel converting information to be transmitted and outputting the converted information;
selecting an arbitrary Walsh code pair among Walsh code pairs predetermined by considering cross correlations;
mixing the selected Walsh code pair with a predetermined pseudo noise (PN) code, and outputting the Walsh code pair;
spreading the parallel-converted information into Walsh codes corresponding to the information;
delaying one symbol between the spread symbols by a predetermined time; and
converting the delayed symbol and the spread symbol into transmission frequency band signals to transmit as wireless signals,
wherein said selecting an arbitrary Walsh code pair among Walsh code pairs predetermined by considering cross correlations comprises:
generating an arbitrary natural number in the number range of the Walsh code pairs; and
outputting a Walsh code pair having a sequence corresponding to the generated natural number among the predetermined Walsh code pairs.

18. The method of claim 17, wherein said outputting a Walsh code pair having a sequence corresponding to the generated natural number among the predetermined Walsh code pairs comprises:
generating a predetermined PN code; and
mixing the Walsh code pair corresponding to the generated natural number with the PN code, and outputting the Walsh code pair.

* * * * *